US006093903A

United States Patent [19]

Schneider

[11] Patent Number: 6,093,903

[45] Date of Patent: Jul. 25, 2000

[54] PLASMA BURNER DEVICE WITH ADJUSTABLE ANODE AND FIXED CATHODE

[75] Inventor: Gottfried Schneider, Stuttgart, Germany

[73] Assignee: Deutsches Zentrum fuer Luft- und Raumfahrt e.V., Bonn, Germany

[21] Appl. No.: 09/059,745

[22] Filed: Apr. 14, 1998

[30] Foreign Application Priority Data

Apr. 18, 1997 [DE] Germany ........................... 197 16 236

[51] Int. Cl.[7] ...................................................... B23K 10/00

[52] U.S. Cl. ................................ 219/121.36; 219/121.52; 219/121.48; 219/75

[58] Field of Search ............................ 219/121.49, 121.5, 219/121.52, 121.48, 121.36, 121.59, 74, 75; 313/231.31, 231.41; 315/111.21

[56] References Cited

U.S. PATENT DOCUMENTS

| | | | |
|---|---|---|---|
| 4,788,408 | 11/1988 | Wlodarczyk et al. | 219/121.52 |
| 4,896,016 | 1/1990 | Broberg et al. | 219/121.5 |
| 5,210,392 | 5/1993 | Labrot et al. | 219/121.49 |
| 5,466,905 | 11/1995 | Flowers et al. | 219/121.46 |
| 5,897,795 | 4/1999 | Lu et al. | 219/121.52 |

FOREIGN PATENT DOCUMENTS

| | | |
|---|---|---|
| 0 249 238 | 12/1987 | European Pat. Off. . |
| 0 289 961 | 11/1988 | European Pat. Off. . |
| 0 639 041 | 2/1995 | European Pat. Off. . |
| 36 42 375 | 6/1988 | Germany . |
| 3-133099 | 6/1991 | Japan . |
| 91 02619 | 3/1991 | WIPO . |
| WO 91/02619 | 3/1991 | WIPO . |

*Primary Examiner*—Mark Paschall

*Attorney, Agent, or Firm*—Barry R. Lipsitz

[57] ABSTRACT

A plasma burner is provided which includes a combustion chamber, in which an arc is generated between an adjustable anode and a fixed cathode. An operating gas is supplied to the combustion chamber for plasma formation. A positioning device enables the anode and the cathode to be positioned relative to one another and fixed.

39 Claims, 3 Drawing Sheets

PLASMA BURNER DEVICE WITH ADJUSTABLE ANODE AND FIXED CATHODE

The present disclosure relates to the subject matter disclosed in German Application No. 197 16 236.3 of Apr. 18, 1997, the entire specification of which is incorporated herein by reference.

BACKGROUND OF THE INVENTION

The invention relates to a plasma burner device with a combustion chamber, in which an arc may be generated between an anode and a cathode, whereby an operating gas may be supplied to the combustion chamber for plasma formation.

The invention also relates to a process for operating a plasma burner device, which comprises a combustion chamber, in which an arc is generated between an anode and a cathode and an operating gas is supplied to the combustion chamber for plasma formation.

Such devices and processes are known from the prior art. They are used, for example, in coating or vacuum evaporation systems in which a work piece is coated by means of additional materials. The operating gas absorbs arc energy in the combustion chamber, a plasma flame is formed in the combustion chamber, and the additional material is melted in a resulting plasma jet and is sprayed onto the work piece at high speed.

Plasma devices are also used to separate or weld work pieces by means of a plasma jet.

The object of the invention is to improve a plasma burner device with the aforementioned features in such a way that it may be used universally and inexpensively.

SUMMARY OF THE INVENTION

This object is achieved with the plasma burner device with the aforementioned features according to the invention in that a positioning device is provided, by means of which the anode and the cathode may be positioned relative to one another and fixed.

In the plasma burner devices known from the prior art, the distance between the anode and the cathode is generally fixedly set and a change in this setting during operation of the plasma burner device is not possible. Since operation causes an unavoidable consumption of the electrodes and in particular of the cathode in the case of these known devices, the plasma burner device must be dismantled from time to time and readjusted in a costly process, which leads to correspondingly long stoppage times and high costs. In the case of the plasma burner device according to the invention, the anode and the cathode may be positioned relative to one another, so that in particular a readjustment of the relative position between the anode and cathode is possible. As a result, the plasma burner device according to the invention may be operated so that the relative position between the anode and cathode is optimized with regard to their consumption. Hence, as a result of the plasma burner device according to the invention, the service life of the electrodes is increased and the stoppage times and operating costs thus reduced.

In the case of the plasma burner devices known from the prior art, the cathode is oversized in order to reduce the risk of burn-out of the electrodes as a result of consumption. Since the relative position between the anode and cathode may be readjusted in the plasma burner device according to the invention, this oversizing of the cathode may be dispensed with.

Because the anode and the cathode are capable of being positioned relative to one another "in situ", the plasma burner device according to the invention can be adapted to variable operating conditions to enable special processing procedures to be performed in this manner in that a specific optimum plasma flame structure for the respective working procedure is generated, for example, by adapting the relative position between the anode and cathode. In the devices known from the prior art this "in situ" adjustment of the relative position between the anode and cathode is not possible, instead a readjustment of this relative position during non-operation of the plasma burner device is possible at best, this, moreover, requiring the device to be dismantled and opened.

It is advantageous if the combustion chamber is rotationally symmetric with respect to a vertical axis. In this way, electrode consumption is distributed symmetrically and the combustion chamber does not have any marked critical points, which may act as field peaks for electrode breakdowns, for example.

In order to construct the combustion chamber to be rotationally symmetric, the anode is advantageously rotationally symmetric with respect to the vertical axis. In an advantageous variant of an embodiment, the anode is an annular electrode, in which case the combustion chamber may be formed by an internal annular area of the annular electrode.

The anode is then advantageously constructed in nozzle or jet form so that a plasma jet, which in particular has a high kinetic energy, may be formed for processing the work piece.

For formation of a rotationally symmetric combustion chamber it is advantageously provided that the cathode is rotationally symmetric with respect to the vertical axis. A rotationally symmetric combustion chamber is thus formed in that the cathode extends into the internal annular area of the anode and the arc may be generated in the internal annular area between the anode and the cathode.

In an advantageous variant of an embodiment, the cathode comprises a conical cathode element, the cone point of which in particular points in the direction of a plasma discharge of the plasma burner device. This allows a high field intensity to be generated between the anode and cathode for optimum plasma formation from the operating gas.

No details have so far been given with respect to the construction of the positioning device. The positioning device is advantageously constructed so that the anode and cathode are displaceable relative to one another in the direction of the vertical axis. As a result, the rotational symmetry of the combustion chamber is maintained during the displacement of the anode and cathode relative to one another, so that no critical points can form in the combustion chamber, for example, for field breakdowns as a result of a change in the relative position between the anode and cathode. In addition, adjustment of the relative position between the anode and cathode is simplified as a result of this, since the control variable may, for example, be a distance with respect to a relative working point position between the anode and cathode, and thus the adjustment of the relative position comprises only a single control variable.

It is conceivable, in principle, that both the anode and the cathode are displaceable in the direction of the vertical axis, or that the cathode is displaceable in the direction of the vertical axis. In a structurally particularly favourable variant of the plasma burner device according to the invention, the anode is displaceable via the positioning device relative to the cathode which is fixed in the housing of the plasma burner device. Since the anode extends as far as a lower end or in the vicinity of a lower end of the plasma burner device, a displaceability of the anode may be achieved in a structurally simpler manner than displaceability of the cathode.

It is provided according to the invention that the anode may be cooled by a coolant. As a result, a long service life of this electrode is achieved, whereby the accessible range of plasma temperatures for the plasma flame formed in the combustion chamber is increased.

In a structurally favourable embodiment the anode sits non-positively in an anode holder. As a result, the anode shape, in which the geometric shape of the combustion chamber is characterized and which is decisive for the plasma formation as a result of the arc generated between the cathode and anode, can be disengaged by production measures from the configuration of the fastening of the anode in the plasma burner device according to the invention. It is advantageous then if the anode holder is displaceable via the positioning device so that adjustment of the relative position between the anode and cathode is thus achieved by a displacement of the anode holder with the anode sitting non-positively therein.

Coolant ducts are then integrated into the anode holder for optimum application of coolant to the anode.

In order to supply coolant to the anode, coolant ducts must lead from a coolant supply through a housing of the plasma burner device according to the invention to the anode. Since the anode is displaceable by the positioning device, the positioning device advantageously comprises sealing guide means for a coolant supply to the anode and a coolant discharge means from the anode, which assure coolant application in any position of the anode and cathode relative to one another.

The sealing guide means can be arranged in the anode holder in order to guide connection elements of coolant ducts of the plasma burner device, which feed into the coolant ducts of the anode holder, upon relative displacement between the anode holder and cathode. According to the invention, sealing guide means may also be provided in the housing in order to guide connection elements of coolant ducts of the anode holder, which feed into coolant ducts arranged in the housing of the plasma burner device, upon relative displacement between the anode holder and cathode.

In a particularly advantageous embodiment of the plasma burner according to the invention, the coolant ducts are arranged and constructed for the application of coolant to the anode in the plasma burner device in such a way that they may be produced by machining to be free from counter-bores and are free from soldering joints. As a result, no counter-bores of the coolant ducts need to be soldered so as to be pressure-tight. This enables the plasma burner device (with the exception of the electrodes) to be produced from light metal materials such as aluminium hard alloys. The plasma burner device according to the invention thus has a low weight and is thus universally usable. The flow of coolant to the anode through the coolant ducts can also be optimized, since the shape of the flow ducts can be readily adapted to, and in particular an unchecked flow of solder is prevented, which can arise when counter-bores are sealed by soldering and whereby there is the risk of it reducing the cross-section of coolant ducts in an uncontrollable manner, in particular at critical throughflow points.

The positioning device is advantageously arranged so as to be fixed to the housing in order to effect a relative displacement between the anode and the cathode. In this case, the positioning device is advantageously constructed so that the anode and cathode are continuously displaceable relative to one another in order to permit a fine adjustment of the relative position.

In a variant of an embodiment of the plasma burner device according to the invention, the positioning device has a position range of relative displacement between the anode and the cathode in the direction of the vertical axis of up to 5 mm. This enables a readjustment of the relative position in a broad range.

It is structurally particularly advantageous if the positioning device comprises a vertical slideway for displacement of the anode relative to the cathode in the direction of the vertical axis. The anode holder then advantageously has a coupling element which is connected non-positively to the positioning device. In this way, the anode holder may be displaced in vertical direction via the positioning device and a position between the anode and the cathode may be fixed.

It can be provided according to the invention that a spindle element is guided in the vertical slideway of the positioning device, said spindle element being connected non-positively to the coupling element of the anode holder, so that displacement of the anode holder with the anode relative to the cathode occurs as a result of a displacement of the spindle.

The positioning device advantageously comprises a positioning means, by means of which a vertical displacement of the anode holder can be performed. It may be provided in particular that the positioning means is a knurled or milled nut. However, for optimum control and adjustment it is advantageous in particular if the positioning means is an actuating drive such as an electric motor or a hydraulic actuating drive, for example.

In order to fix the position between the anode and cathode, the positioning device advantageously comprises a fixing means which fixes the position of the anode relative to the cathode. The fixing means can comprise locking screws and/or locking pins.

In a particularly advantageous variant of an embodiment of the plasma burner device according to the invention the fixing means is constructed as a clamping device, by means of which the spindle can be clamped to be secure against displacement in the slideway. The clamping device can comprise an actuating drive for its operation. From this result extensive control and adjustment possibilities, since the release of the fixture of the relative position between the anode and cathode can be controlled, the relative displacement between the anode and cathode can be controlled and/or adjusted, the fixture can be controlled by operation of the clamping action of the clamping device and these control and adjustment procedures can be combined with one another and expanded on the basis of one another.

For this, the plasma burner device advantageously comprises a control and adjustment unit, which controls the positioning means for the vertical displacement of the anode and cathode relative to one another and which controls the fixing means for fixing a relative position between the anode and cathode.

In order to achieve universal usability of the plasma burner device according to the invention, it is particularly advantageous if the control of the displacement and the fixing means can be performed in dependence upon characteristic operating parameters of the plasma burner device. It is then also advantageous in particular if the relative position between the anode and cathode can be adjusted by the control and adjustment unit in dependence upon characteristic operating parameters of the plasma burner device.

The characteristic operating parameters in this case can respectively comprise the parameters: temperature of the coolant upon supply to the anode and discharge from the anode; anode temperature; temperature of a work piece to be processed by means of a plasma jet; heat capacity of the operating gas; mass throughput of the operating gas; arc temperature; temperature of a plasma flame; mass throughput of an additional material, which is subjected to the plasma flame; voltage-current characteristic of the plasma burner device, or may also comprise a combination of these parameters.

The plasma burner device according to the invention may advantageously be used in a coating or vacuum evaporation system.

In addition, the object forming the basis of the invention with the aforementioned features is to provide a process for operating a plasma burner device, which makes the plasma burner device universally usable.

This is achieved with the process for operating a plasma burner device with the aforementioned features according to the invention in that a relative position of the anode and cathode is adjusted in dependence upon characteristic operating parameters of the plasma burner device.

In this way, a plasma jet, which is generated by the plasma burner device, may be optimized for the respective processing procedure of a work piece. Further advantages of the process according to the invention have already been explained in conjunction with the device according to the invention.

DETAILED DESCRIPTION OF THE INVENTION

Figure 1:
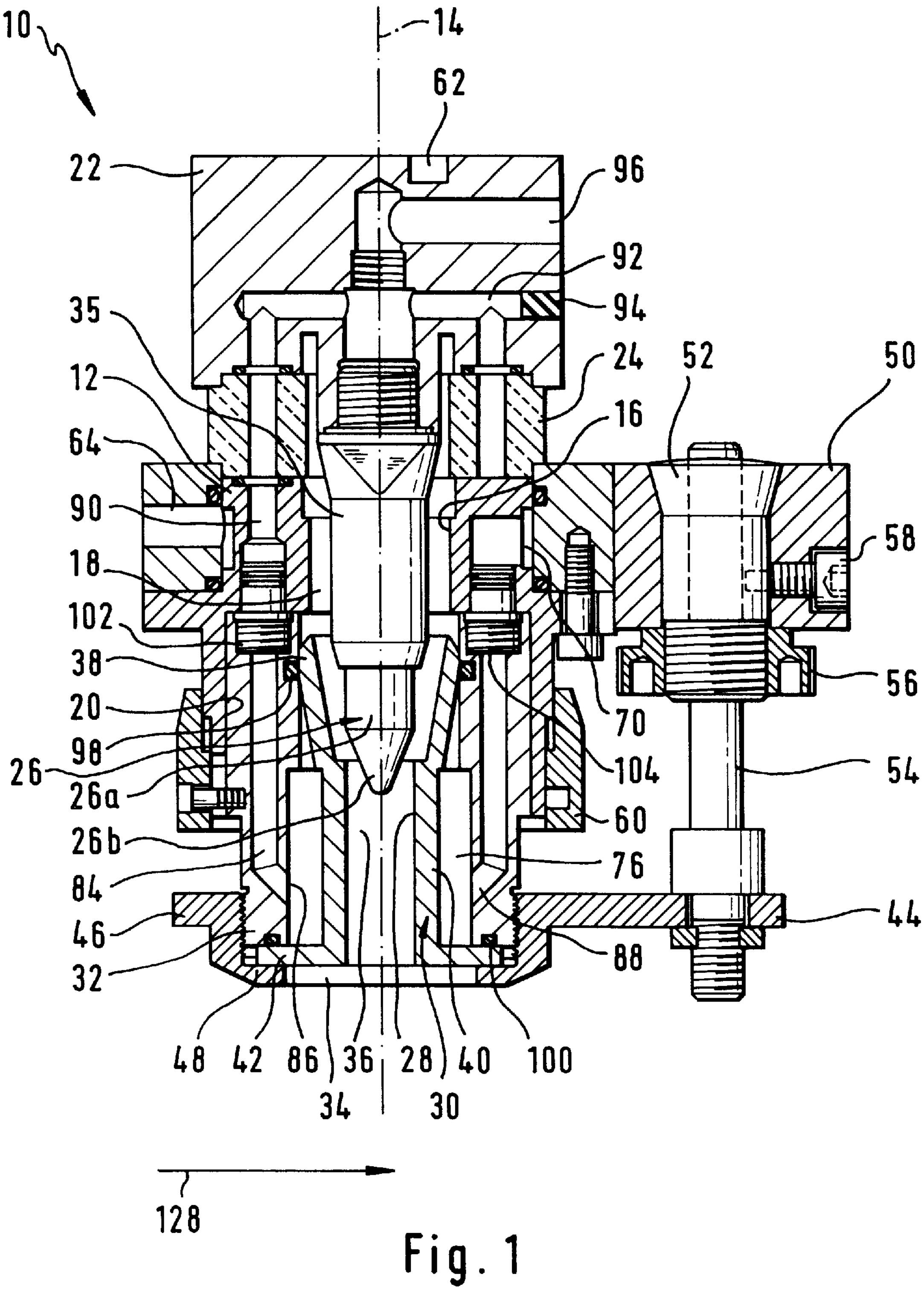
FIG. 1 a variant of an embodiment of the plasma burner device according to the invention.

An embodiment of a plasma burner device according to the invention, which has been given the overall reference 10 in FIG. 1, comprises a housing 12, in which a cavity 16 is formed coaxially to a vertical axis 14. The cavity has a first section 18 and a second section 20 adjoining the first section 18, the second section 20 having a larger diameter than the first section 18.

A cathode holder 22, which is electrically isolated from the housing via insulating elements 24 sitting between the cathode holder 22 and the housing 12, is arranged on the upper side of the housing 12.

The cathode holder 22 holds a cathode 26, which is coaxial to the vertical axis 14 and extends through the first section 18 of the cavity 16 into an internal annular area 28 of an anode 30. The internal annular area 28 is rotationally symmetric to the vertical axis 14.

The anode 30 is inserted into an anode holder 32, which itself sits in the second section 20 of the cavity 16 of the housing 12.

The cathode 26 is constructed as a conical cathode with a cylindrical cathode element 26*a* and a conical cathode element 26*b* sitting thereon, whereby the cone point is rounded and points coaxially to the vertical axis 14 in the direction of a plasma outlet 34 of the internal annular area 28 of the anode 30. The cathode 26 is held on a cathode holding element 35 on the cathode holder 22.

A combustion chamber 36, in which an arc may be generated between the anode 30 and the cathode 26, rotationally symmetric to the vertical axis 14 is formed between the cathode 26, which is made from tungsten, for example, and the internal annular area 28 of the anode 30, which is made from copper, for example. For generation of an electric field between the cathode 26 and anode 30, the plasma burner device 10 comprises electric supply lines respectively to the cathode 26 and anode 30 (not shown in the figure).

The anode 30 has a first section 38 and in the case of this first section 38 the cross-section of the internal annular area 28 decreases in the direction of the plasma outlet 34 and merges into a second section 40, in which the internal annular area 28 has a constant cross-section. At its lower end, the anode 30 has an annular lateral outward flange 42, so that the second section 40 is L-shaped in cross-section.

A coupling element 44, which has a part constructed as a screw cap 46, is connected non-positively to the anode holder. This screw cap 46 has an annular support surface 48, by means of which the outward flange 42 is clamped against the anode holder 32 when the screw cap 46 is screwed onto this, as a result of which the anode 30 is held in the anode holder 32.

A positioning device 50 sits on the housing 12. This device has a slideway 52, in which a spindle 54 with an axis parallel to the vertical axis 14 is guided. The spindle has a positioning means 56 in the form of a knurled nut, for example, by means of which a displacement of the spindle 54 may be effected in the direction of the vertical axis 14.

The positioning device 50 additionally has a fixing means 58 in the form of locking screws or locking pins, for example, by means of which the spindle 54 may be laid in the slideway 52 in non-positive connection with the housing 12 of the plasma burner device 10 according to the invention.

The spindle 54 is connected non-positively to the coupling element 44 of the anode holder 32 so that a displacement of the spindle 54 in the direction of the vertical axis 14 effects a displacement of the anode holder 32 in the direction of the vertical axis 14. For this, the anode holder 32 has an anode holder guide means 60, by means of which this may be displaced in the second section 20 of the cavity 16 on the housing 12 in the direction of the vertical axis 14.

From an operating gas supply (not shown in the figure), a supply line 62 for operating gas, which may be argon or hydrogen, for example, leads into the combustion chamber 36, where the operating gas can absorb arc energy from an arc formed between the anode 30 and cathode 26 and a plasma is formed. Because of the first section 38 and the second section 40 of the anode 30, this is constructed in the form of a nozzle and the formed plasma can be discharged as a plasma jet from the plasma outlet 34 of the plasma burner device 10.

Figure 2:
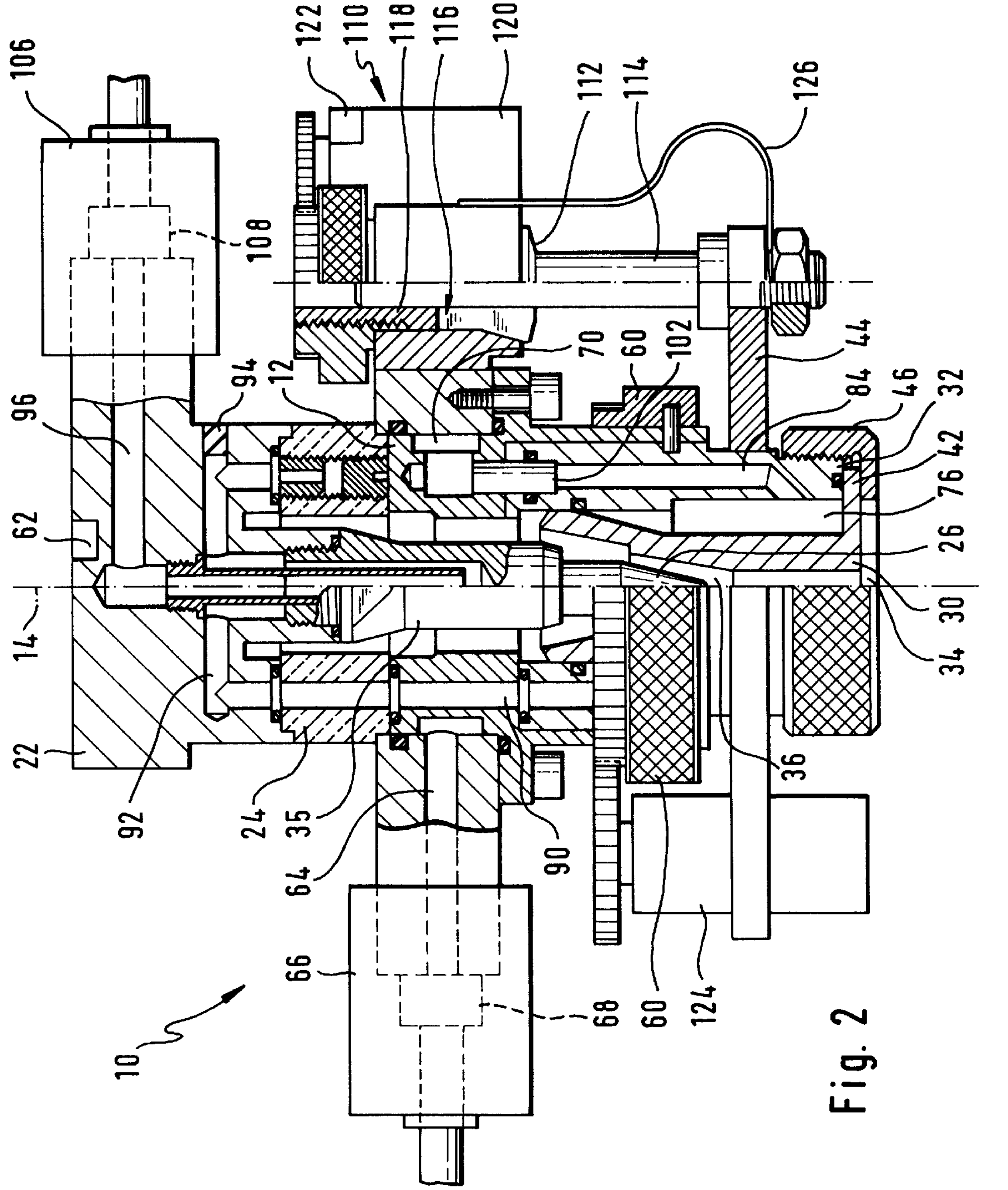
FIG. 2 a partial sectional view of a further variant of an embodiment of the plasma burner device according to the invention.
Figure 3:
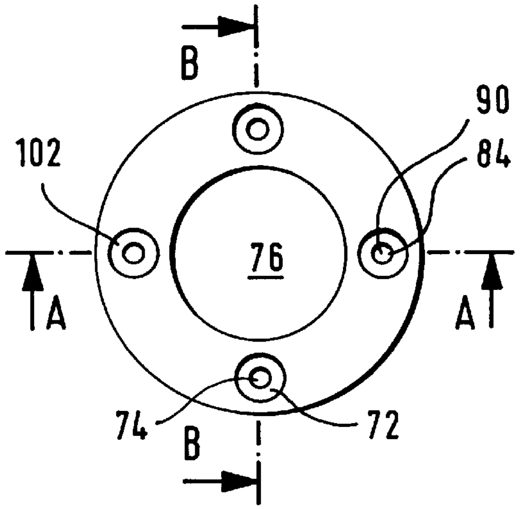
FIG. 3 a top view onto an anode holder according to the invention.

For the application of coolant to the anode 30, the plasma burner device according to the invention has a coolant supply line 64, to which a coolant supply (not shown in the figure) may be coupled by means of a coupling 66 (FIG. 2). The coupling 66, which is constructed in particular as a plug-type coupling, comprises a conical sealing valve 68.

Figure 4:
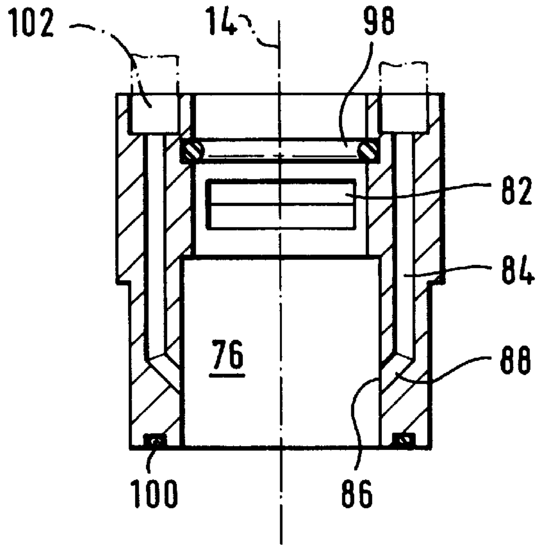
FIG. 4 a sectional view taken along line AA in FIG. 3.
Figure 5:
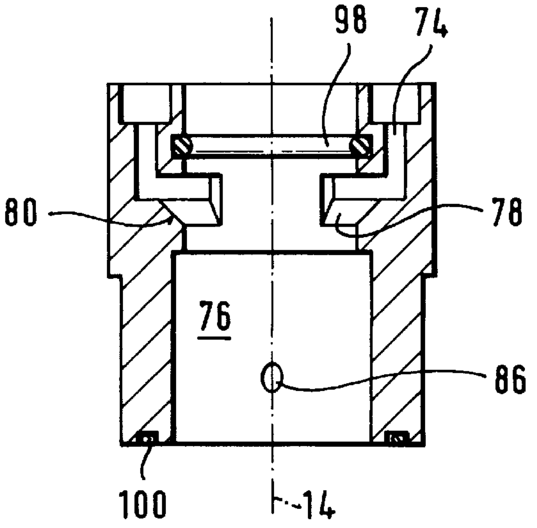
FIG. 5 a sectional view taken along line BB in FIG. 3.

The coolant supply line 64 feeds into an annular area 70 in the housing 12. Coolant supply lines 72 lead from this annular area through the housing 12 to the anode holder 32 (concealed in FIGS. 1 and 2). These coolant supply lines 72 feed into coolant supply lines 74 (FIG. 5), which are arranged in the anode holder 32 with an axis parallel to the vertical axis 14. The coolant supply lines 74 feed at openings 78 into the flow chamber 76 of the anode holder 32, through which coolant may be applied to the anode 30. In the direction of the plasma discharge, the openings 78 have an inclined portion 80 and in the circumferential direction have a widened portion 82 (FIG. 4) in order to thus apply coolant over a large area to the anode 30 via the flow chamber 76.

Coolant discharge means 84 lead out of the flow chamber 76 from outlets 86, which are arranged in the vicinity of a lower end of the flow chamber 76 and serve for the discharge of coolant. In this case, intermediate ducts 88 with an axis forming an angle in the direction of the vertical axis 14 are arranged between the outlets 86 and the coolant discharge means 84 with an axis parallel to the vertical axis 14.

The coolant discharge means 84 feed into coolant ducts 90, which lead through the housing 12 and the insulating elements into a collection pipe 92 which is arranged in the cathode holder 22 with an axis perpendicular to the vertical axis 14. The collection pipe 92 is formed by a bore, for example, and is closed off from an external chamber of the plasma burner device 10 according to the invention by means of a stopper 94. A coolant discharge means 96 leads from the collection pipe 92 to a coolant discharge unit in order to discharge the heated discharged coolant or to prepare it for transport in a circuit.

The flow chamber 76 is sealed so as to be fluid-tight with respect to the first section 18 of the cavity 16, and thus with respect to the combustion chamber 36, by means of an O-ring 98 sitting in a recess, said recess being formed in the anode holder 32 in an upper region of the first section 38 of the anode 30.

At its lower end, the flow chamber 76 is sealed with respect to the outward flange 42 of the anode 30 by an O-ring 100 sitting in a recess.

The anode holder 32 according to the invention has sealing guide means 102, by means of which the connection elements 104 of the coolant ducts 90 feeding into the coolant discharge means 84 are guided upon displacement of the anode holder 32 in the direction of the vertical axis 14, and that is such that the coolant discharge means is sealed with respect to the anode holder 32 and the housing 12. Such sealing guide means are likewise provided according to the invention for the supply of coolant via connection elements of the coolant supply means 72 into the coolant supply means 74 of the anode holder 32.

The coolant discharge means 96 is connected via a coupling 106 (FIG. 2), which is in particular constructed as a plug-type coupling, to a coolant discharge unit (not shown in the figure). The coupling 106 comprises a conical sealing valve 108. The coolant discharge unit serves for discharge and disposal of the coolant, or in the case of a variant of an embodiment, for preparation of the coolant so that this may be directed into a circuit.

The sealing guide means for the supply of coolant and discharge of coolant to and from the anode may also be arranged in the housing 12 according to the invention, in which case the connection elements then accordingly belong to the coolant supply means 74 and the coolant discharge means 84.

The coolant ducts are arranged and constructed in such a way that they may be produced by machining to be free from counter-bores and are free from soldering joints. The coolant supply means 74, for example, may be formed by a blind hole and the openings 78 are formed so that these are milled out by milling using a disc-type miller cutter and are connected to the corresponding coolant supply means 74. Since the coolant ducts do not need to be soldered to close off the counterbores because of the absence of counter-bores therein, the plasma burner may be made from a light metal material, for example, an aluminium hard alloy.

In a second variant of an embodiment, which is shown in FIG. 2, the plasma burner according to the invention differs from that shown in FIG. 1 and described above essentially by the configuration of the positioning device. The plasma burner according to the invention shown in FIG. 2 is otherwise basically constructed as described above.

A positioning device 110 (FIG. 2) is held on the housing 12 of the plasma burner device according to the invention in the second variant. This positioning device comprises a slideway 112, in which a spindle 114 is guided parallel to the vertical axis 14. The spindle is non-positively connected to the coupling element 44 of the anode holder 32.

The positioning device 110 has a clamping device 116, by means of which the spindle 114 may be clamped non-positively in the slideway 112, so that the spindle 114 is held non-positively in the positioning device 110.

In this way, the clamping device 116 acts as a fixing means, by means of which a specific position of the anode 30 relative to the cathode 26 may be fixed.

For this, the clamping device 116 comprises a collet chuck 118, which may be moved in vertical direction parallel to the axis 14 by a drive 120, and in this way can clamp the spindle 114 non-positively in the slideway 112 and can release the clamping tension again by reverse movement. The drive 120 is connected to a control and adjustment unit 122, which controls the clamping device 116 for fixing the spindle 114 in the slideway 112.

The positioning device 110 additionally comprises an actuating drive 124, which can be an electric motor or a hydraulic drive, for example, by means of which the spindle 114 may be moved in the slideway 112 in the direction of the vertical axis 14, so that the anode holder 32 may be displaced with the anode 30 relative to the cathode 26 by means of the coupling element 44.

The electric supply line for the anode 30 is guided in the positioning device 110 via a flexible conductor loop 126. This ensures that a displacement of the spindle 114, and thus the anode holder 32, does not lead to interference in the supply of electrical energy to the anode 30.

It can be provided according to the invention that the plasma burner device is covered with a protective layer, for example, on a ceramic base, and serves to insulate against electrical breakdowns, and thus also to protect operating personnel. The layer thickness of the protective layer can lie in the order of 50 $\mu$m, for example.

The plasma burner device according to the invention operates as follows:

An arc is generated between the anode 30 and cathode 26 in the combustion chamber 36. The operating gas is directed into the combustion chamber 36 via the operating gas supply means 62 and in the arc absorbs arc energy, which leads to plasma formation. The plasma flame generated thereby is discharged from the plasma outlet 34 through the nozzle-like construction of the anode 30 as a plasma jet.

If the plasma burner device is used in a coating or vacuum evaporation system, then an additional material 128 is introduced into the plasma jet, for example, in powder form as a metal powder or in rod form. This additional material is melted by the plasma jet, and by means of the plasma jet is fed at high kinetic energy to a work piece to be processed.

The anode 30 has a coolant, in particular water, applied to it in order to remove heat from it. The coolant is applied into the flow chamber 76 via the coolant supply means 74 and the heated coolant, which removes the heat from the anode 30, is fed to the coolant discharge unit via the coolant discharge means 84.

The anode holder 32 with the anode 30 inserted non-positively therein is displaced coaxially to the vertical axis 14 by the positioning device 110 so that the relative position between the anode 30 and the cathode 26 is changed by this displacement. The displacement is achieved on the basis that firstly the fixing means 58 (FIG. 1) or 118 (FIG. 2) is released and the spindle is displaced in a direction parallel to the vertical axis by means of the positioning means via the knurled nut 56 (FIG. 1) or the actuating drive 124 (FIG. 2), and thus the anode holder 32 is displaced as a result of the non-positive coupling to the coupling element 44.

In this case, the displacement is in particular achieved in such a way that the operation of the plasma burner device 10 according to the invention is optimized, for example, with respect to optimization regarding consumption of the electrodes 26 and 30.

In a variant of an embodiment, the axial displacement is achieved in such a way that it is adjusted via the control and adjustment unit 122 in dependence upon characteristic operating parameters of the plasma burner device 10, whereby the control and adjustment unit controls the actuating drive 124. The characteristic operating parameters can in this case comprise:

the temperature of the coolant upon supply to the anode 30 and discharge from the anode 30; the anode temperature; the temperature of a work piece to be processed by means of the plasma jet; the heat capacity of the operating gas; the mass throughput of the operating gas through the combustion chamber 36; the mass throughput of the additional material 126, which is subjected to the plasma flame; the voltage-current characteristic of the plasma burner device 10.

The control and adjustment is achieved in dependence upon one or a combination of these parameters, whereby further parameters not listed above may also be taken into consideration. To determine the characteristic parameters, the appropriate measurement devices (not shown in the figures) are provided according to the invention.

The adjustment of the relative position between the anode 30 and the cathode 26 is achieved in this case in such a way that, for example, the plasma burner device 10 according to the invention operates in an optimum range, or an optimum plasma jet geometry for a special processing procedure is generated with the resulting plasma jet.

The control and adjustment concept is used in a working range around a working point position between the anode 30 and cathode 26, whereby the working point can be fixed in particular by means of an optimum value with respect to the consumption of the electrodes 26 and 30. The control and adjustment is deactivated if the relative displacement with respect to this position of the working point moves out of the working range so as to thus prevent the risk of electrode damage, for example, as a result of electrode breakdowns. The working range typically covers an axial displacement area in the order of magnitude of about 5 mm.

What is claimed is:

1. A plasma burner comprising:

a housing;

an annular anode mounted to an anode holder;

a cathode extending into an internal area of the anode, said cathode being fixed with respect to the housing;

a combustion chamber formed between said anode and cathode where an arc between the anode and cathode can be generated, said combustion chamber being adapted to receive an operating gas for the formation of a plasma; and a positioning device connected to the anode holder for positioning and fixing the anode holder relative to the housing and allowing a displacement of the anode relative to the cathode, said positioning device being attached externally to the housing.

2. A plasma burner according to claim 1, wherein the combustion chamber is rotationally symmetric with respect to a vertical axis.

3. A plasma burner according to claim 2, wherein said positioning device is constructed so that the anode and cathode are displaceable relative to one another in the direction of said vertical axis.

4. A plasma burner according to claim 1, wherein said anode is rotationally symmetric with respect to a vertical axis.

5. A plasma burner according to claim 1, wherein said anode is constructed as a nozzle.

6. A plasma burner according to claim 1, wherein said cathode is rotationally symmetric with respect to a vertical axis.

7. A plasma burner according to claim 6, wherein said cathode comprises a conical cathode element.

8. A plasma burner according to claim 1, wherein said anode is displaceable via the positioning device relative to the cathode.

9. A plasma burner according to claim 1, further comprising means for cooling said anode with a coolant.

10. A plasma burner according to claim 1, wherein said anode sits non-positively in said anode holder.

11. A plasma burner according to claim 10, wherein said anode holder is displaceable via the positioning device.

12. A plasma burner according to claim 10, further comprising coolant ducts integrated into the anode holder for applying coolant to the anode.

13. A plasma burner according to claim 1 wherein said anode is cooled by a coolant supply, said plasma burner further comprising sealing guide means for the coolant supply and a coolant discharge means from the anode, to enable coolant application in any position of the anode and the cathode relative to one another.

14. A plasma burner according to claim 13, wherein said sealing guide means are arranged in the anode holder in order to guide connection elements of coolant ducts of the plasma burner device, which feed into coolant ducts of the anode holder, upon relative displacement between the anode holder and cathode.

15. A plasma burner according to claim 13, wherein sealing guide means are provided in the housing in order to guide connection elements of coolant ducts of the anode holder, which feed into coolant ducts arranged in the housing of the plasma burner device, upon relative displacement between the anode holder and cathode.

16. A plasma burner according to claim 1, wherein said anode is cooled by a coolant supply, and coolant ducts for the application of coolant to the anode are arranged and constructed to enable them to be machined without counterbores and soldering joints.

17. A plasma burner according to claim 1, wherein the positioning device is constructed so that the anode and cathode are continuously displaceable relative to one another.

18. A plasma burner according to claim 1, wherein the positioning device enables the anode and cathode to be displaced relative to one another along a vertical axis with a position range of up to 5 mm relative displacement.

19. A plasma burner according to claim 1, wherein the positioning device comprises a vertical slideway for displacement of the anode relative to the cathode along a vertical axis.

20. A plasma burner according to claim 1, wherein the anode sits non-positively in said anode holder, and said anode holder has a coupling element connected non-positively to the positioning device.

21. A plasma burner according to claim 1, wherein a spindle element is guided in a vertical slideway of the positioning device, said spindle element being connected non-positively to the coupling element of the anode holder.

22. A plasma burner according to claim 19, wherein the positioning device comprises a positioning means for actuating a vertical displacement of the anode.

23. A plasma burner according to claim 22, wherein said positioning means comprises a knurled nut.

24. A plasma burner according to claim 22, wherein said positioning means comprises an actuating drive.

25. A plasma burner according to claim 19, wherein the positioning device comprises means for fixing the position between the anode and cathode.

26. A plasma burner according to claim 25, wherein the fixing means comprises at least one of locking screws and locking pins.

27. A plasma burner according to claim 25, wherein the fixing means comprise a clamping device for clamping a spindle element against displacement in the slideway.

28. A plasma burner according to claim 27, further comprising a drive for operating said clamping device.

29. A plasma burner according to claim 22, further comprising a control and adjustment unit to control the positioning means for the vertical displacement of the anode and cathode relative to one another.

30. A plasma burner according to claim 29, wherein the control and adjustment unit controls means for fixing a relative position between the anode and cathode.

31. A plasma burner according to claim 29, wherein said vertical displacement is controlled in dependence upon characteristic operating parameters of the plasma burner device.

32. A plasma burner according to claim 29, wherein the relative position between the anode and cathode is adjustable by the control and adjustment unit in dependence upon characteristic operating parameters of the plasma burner device.

33. A plasma burner according to claim 31, wherein the characteristic operating parameters comprise at least one of:

temperature of the coolant upon supply to the anode and discharge from the anode;

anode temperature;

temperature of a work piece to be processed by means of a plasma jet;

heat capacity of the operating gas;

mass throughput of the operating gas;

arc temperature;

temperature of a plasma flame;

mass throughput of an additional material subjected to the plasma flame; and a voltage-current characteristic of the plasma burner device.

34. A process for operating a plasma burner having a combustion chamber in which an arc is generated between an annular anode mounted to an anode holder and a cathode which extends into an internal area of the anode, and an operating gas is supplied to the combustion chamber for plasma formation, comprising the steps of:

providing a positioning device attached externally to a housing of the plasma burner and connected to the anode holder for adjusting a relative position of the anode and cathode; and adjusting the relative position of the anode and cathode in dependence upon characteristic operating parameters of the plasma burner.

35. A process according to claim 34, wherein said adjusting step is achieved by vertical displacement of the anode in a direction of an axis of symmetry of the combustion chamber.

36. A process according to claim 34, wherein said adjusting step is controlled in dependence upon said characteristic operating parameters.

37. A process according to claim 34, wherein:

the relative position between the anode and cathode is adjusted around a working point position within a given working range; and the position of the working point is determined by characteristic parameters of the plasma burner.

38. A process according to claim 37, wherein:

said adjusting step is controlled in dependence upon said characteristic operating parameters; and control of the adjusting step is deactivated when the relative position between the anode and cathode moves out of the given working range.

39. A process according to claim 34, wherein the characteristic operating parameters comprise at least one of:

temperature of a coolant supplied to the anode and discharged from the anode;

anode temperature;

temperature of a work piece to be processed by means of a plasma jet;

heat capacity of said operating gas;

mass throughput of said operating gas;

arc temperature;

temperature of a plasma flame;

mass throughput of an additional material, which is subjected to the plasma flame; and a voltage-current characteristic of the plasma burner.

* * * * *